(12) United States Patent
Yang (10) Patent No.: US 10,720,613 B2
(45) Date of Patent: Jul. 21, 2020

(54) PACKAGING FILM FOR BATTERY AND MANUFACTURING METHOD THEREOF

(71) Applicant: ASUSTeK COMPUTER INC., Taipei (TW)

(72) Inventor: Fei-Lin Yang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 95 days.

(21) Appl. No.: 15/949,229

(22) Filed: Apr. 10, 2018

(65) Prior Publication Data
US 2018/0301670 A1 Oct. 18, 2018

(30) Foreign Application Priority Data

Apr. 17, 2017 (TW) .............................. 106112822 A (51) Int. Cl.
| | |
|---|---|
| H01M 2/02 | (2006.01) |
| B32B 15/20 | (2006.01) |
| B32B 27/34 | (2006.01) |
| B32B 15/09 | (2006.01) |
| B32B 15/085 | (2006.01) |
| B32B 15/088 | (2006.01) |
| B32B 7/12 | (2006.01) |

(Continued)

(52) U.S. Cl.
CPC ........... *H01M 2/0287* (2013.01); *B32B 5/028* (2013.01); *B32B 7/12* (2013.01); *B32B 15/02* (2013.01); *B32B 15/085* (2013.01); *B32B 15/088* (2013.01); *B32B 15/09* (2013.01); *B32B 15/20* (2013.01); *B32B 27/12* (2013.01); *B32B 27/32* (2013.01); *B32B 27/34* (2013.01); *B32B 27/36* (2013.01); *C04B 37/005* (2013.01); *H01M 2/0277* (2013.01); *H01M 2/0285* (2013.01); *C04B 2237/04* (2013.01); *C04B 2237/062* (2013.01); *C04B 2237/083* (2013.01); *H01M 10/0525* (2013.01)

(58) Field of Classification Search
CPC ... H01M 2/0287; H01M 2/0277; B32B 15/02; B32B 7/12; B32B 15/088; B32B 15/085; C04B 37/005; C04B 2237/04; C04B 2237/083
See application file for complete search history.

(56) References Cited

U.S. PATENT DOCUMENTS

| | | | | |
|---|---|---|---|---|
| 4,702,963 A | * | 10/1987 | Phillips | ...................... C08J 7/06 |
| | | | | 426/107 |
| 2002/0125822 A1 | * | 9/2002 | Graff | ................... H01L 51/5256 |
| | | | | 313/506 |
| 2018/0301671 A1 | * | 10/2018 | Muraki | ............... H01M 2/0277 |

FOREIGN PATENT DOCUMENTS

| | | |
|---|---|---|
| CN | 105304846 A | 2/2016 |
| CN | 103545472 B | 3/2016 |
| TW | 201534464 A | 9/2015 |

* cited by examiner

*Primary Examiner* — Hai Vo
(74) *Attorney, Agent, or Firm* — McClure, Qualey & Rodack, LLP (57) ABSTRACT

The invention discloses a packaging film for a battery. The packaging film for the battery comprises an electrolyte-resistant layer, a protective layer, and a high-rigidity material layer. The high-rigidity material layer is located between the electrolyte-resistant layer and the protective layer. The high-rigidity material layer comprises a substrate layer and at least one cermet film. The substrate layer has two surfaces facing the electrolyte-resistant layer and the protective layer respectively. The at least one cermet film is located on at least one of the two surfaces of the substrate layer.

6 Claims, 5 Drawing Sheets

(51) Int. Cl.
*B32B 15/02* (2006.01)
*C04B 37/00* (2006.01)
*H01M 10/0525* (2010.01)
*B32B 27/12* (2006.01)
*B32B 27/32* (2006.01)
*B32B 5/02* (2006.01)
*B32B 27/36* (2006.01)

PACKAGING FILM FOR BATTERY AND MANUFACTURING METHOD THEREOF

CROSS-REFERENCE TO RELATED APPLICATION

This application claims the priority benefit of TW application serial No. 106112822, filed on Apr. 17, 2017. The entirety of the above-mentioned patent applications are hereby incorporated by references herein and made a part of specification.

BACKGROUND

Technical Field

The invention relates to a packaging film for a battery and a manufacturing method thereof.

Related Art

Lithium batteries have been widely used in such fields as portable electronic products, smart phones and electric cars in recent years. In addition, lithium batteries are highly sensitive to temperature, so it is necessary to ensure good stability, sealing performance and heat resistance of a heat sealing port of the lithium battery when temperature increases. Furthermore, with the miniaturization and light weight requirement of electronic devices in recent years, external packaging materials for lithium batteries or lithium-polymer batteries mounted thereon have also been required to be thin and light and high in barrier property and to be suitable for of different sizes and thicknesses.

SUMMARY

According to a first aspect, a packaging film for a battery is provided. The packaging film for the battery comprises an electrolyte-resistant layer, a protective layer and a high-rigidity material layer. The high-rigidity material layer is located between the electrolyte-resistant layer and the protective layer. The high-rigidity material layer comprises a substrate layer and at least one cermet film. The substrate layer has two surfaces facing the electrolyte-resistant layer and the protective layer respectively. The at least one cermet film is located on at least one of the two surfaces of the substrate layer.

According to a second aspect, a manufacturing method of the packaging film for the battery is provided. The manufacturing method comprises the steps of depositing the cermet films on at least one of the two opposite surfaces of the substrate layer to form the high-rigidity material layer; forming a protective layer on one side of one of two opposite surfaces of the high-rigidity material layer; and forming an electrolyte-resistant layer on one side of the other of the two opposite surfaces of the high-rigidity material layer.

BRIEF DESCRIPTION OF THE DRAWINGS

The above and other objects, features, advantages and embodiments of the invention will be more apparent from the following description taken in conjunction with the accompanying drawings.

DETAILED DESCRIPTION

Figure 1A:
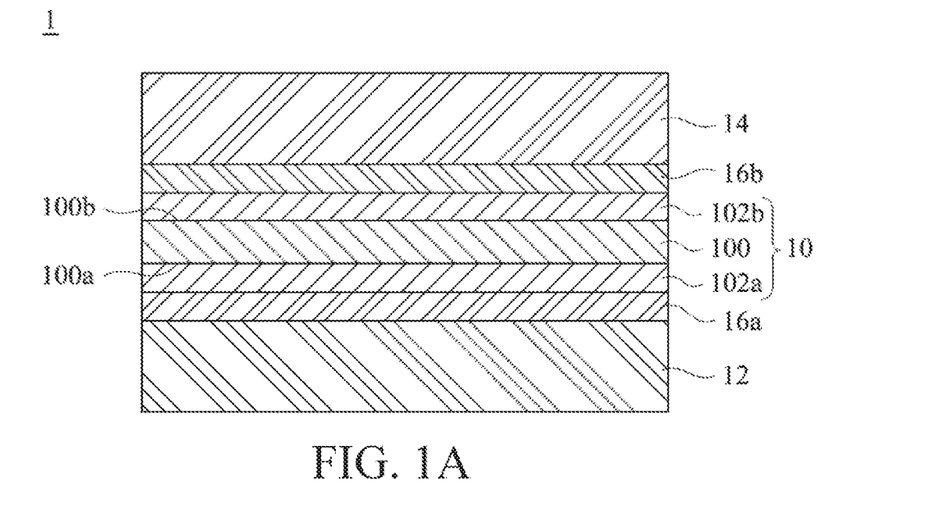
FIG. 1A is a cross-sectional view of a packaging film for a battery according to an embodiment of the invention.

Please refer to FIG. 1A. FIG. 1A is a cross-sectional view of a packaging film 1 for a battery according to an embodiment of the invention. As shown in FIG. 1A, in the present embodiment, the packaging film for the battery comprises an electrolyte-resistant layer 12, a protective layer 14, a high-rigidity material layer 10, a first adhesive layer 16a and a second adhesive layer 16b. The high-rigidity material layer 10 comprises a substrate layer, a cermet film 102a and a cermet film 102b. In the present embodiment, the substrate layer is a polyamide layer 100.

In FIG. 1A, the high-rigidity material layer 10 is located between the electrolyte-resistant layer 12 and the protective layer 14. In addition, when covering the battery with the packaging film 1, the electrolyte-resistant layer 12, the high-rigidity material layer 10 and the protective layer 14 are sequentially arranged from an inner-layer structure close to the battery to an outer-layer structure away from the battery. The polyamide layer 100 in the high-rigidity material layer 10 has a surface 100a facing the electrolyte-resistant layer 12 and a surface 100b facing the protective layer 14. The polyamide layer 100 of the present embodiment is illustrated as a single-layer structure. However, in other embodiments, the polyamide layer 100 is a multilayer structure. In the present embodiment, the material of the polyamide layer 100 is polyamide, for example, nylon. In the high-rigidity material layer 10, the polyamide layer 100 provides a light weight property.

In the embodiment, the cermet film 102a in the high-rigidity material layer 10 is located on the surface 100a of the polyamide layer 100, and the cermet film 102b is located on the surface 100b of the polyamide layer 100. In other words, the cermet film 102a is located between the electrolyte-resistant layer 12 and the polyamide layer 100, and the cermet film 102b is located between the protective layer 14 and the polyamide layer 100.

In addition, the cermet film 102a and the cermet film 102b according to the present embodiment are each illustrated as a single-layer structure. However, in other embodiments, the cermet film 102a or the cermet film 102b has a multilayer structure. In the high-rigidity material layer 10 of the present embodiment, the cermet film 102a and the cermet film 102b provide a high-rigidity characteristic. In addition, the cermet film 102a and the cermet film 102b provide sufficient structural strength at small thicknesses. In one embodiment, the thickness of the high-rigidity material layer 10 is substantially about 4 μm to 10 μm. Therefore, the high-rigidity material layer 10 is shaped according to the appearance of the covered battery, and prevents water or liquid from entering the covered battery.

In the present embodiment, the material of the cermet film 102a and the cermet film 102b comprises cermet. Cermet is ceramic and metallic composite, and has the characteristics of ceramics and the characteristics of metals. The ceramic phase in cermet has the characteristics of high strength, high hardness, wear resistance, high melting point, oxidation resistance, good chemical stability and the like. In addition, the metal phase in cermet has the characteristics of good metal toughness, plasticity and the like. Therefore, the high-rigidity material layer 10 comprising the cermet film 102a or the cermet film 102b has both the aforementioned material characteristics.

Metals in cermet are used as binders for ceramic materials such as oxides, borides or carbides. The metal element used in the present embodiment is Fe, Co, Ni, Cr, W, Mo, any combination of the foregoing materials, or alloys formed by any combination of the foregoing materials. In some embodiments, cermet is metal-matrix composite. Further, the cermet film 102a and the cermet film 102b or the cermet used in the present embodiment is oxide-based cermet, carbide-based cermet, nitride-based cermet, boride-based cermet, silicide-based cermet or any combination of the above.

In one embodiment, the oxide-based cermet comprises alumina (Al2O3)-based cermet, or zirconia (ZrO2)-based cermet. Further, in some embodiments, the alumina-based cermet is doped with chromium (Cr) or chromium-molybdenum alloy (CrMo). As the content of the chromium or chromium-molybdenum alloy in the alumina-based cermet increases, the mechanical strength of the doped alumina-based cermet is increase. As a result, the mechanical strength of the high-rigidity material layer 10 comprising the cermet film 102a or the cermet film 102b is increased accordingly.

In one embodiment, the carbide-based cermet comprises tungsten carbide (WC)-based cermet, titanium carbide (TiC)-based cermet, or chromium carbide (Cr3C2)-based cermet. Further, in some embodiments, the carbide-based cermet is doped with cobalt (Co). When the carbide-based cermet is doped with cobalt, the yield strength of the doped carbide-based cermet material is increased. In addition, in some embodiments, the hardness of the doped carbide-based cermet (Rockwell hardness test, HRC) is substantially 80-92 and the compressive strength is substantially 6000 MPa (10.2 kg/cm2). Thereby, the material hardness and the material yield strength of the high-rigidity material layer 10 comprising the cermet film 102a or the cermet film 102b is increased.

Figure 1B:
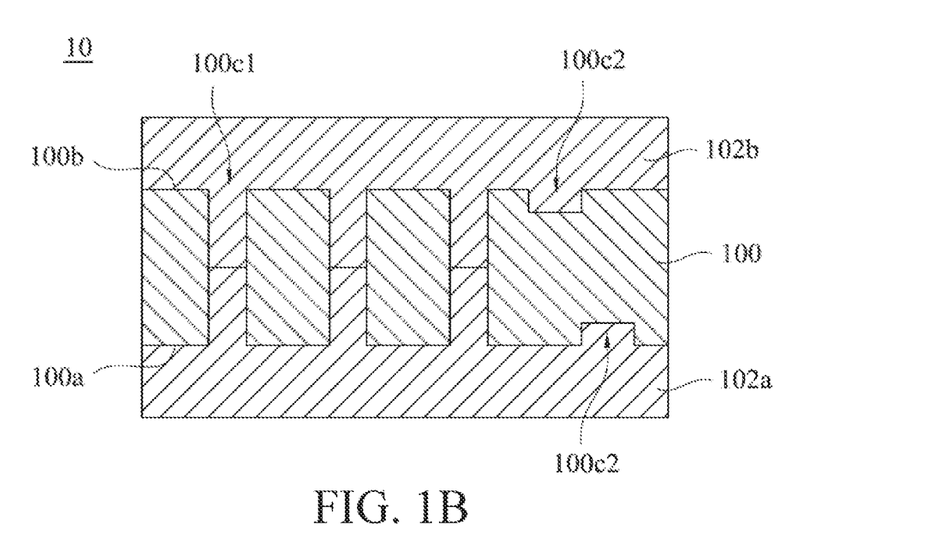
FIG. 1B is a cross-sectional view of a high-rigidity material layer in FIG. 1A.

Please refer to FIG. 1B. FIG. 1B is a cross-sectional view of the high-rigidity material layer 10 in FIG. 1A. In FIG. 1B, the polyamide layer 100 of the high-rigidity material layer 10 has a plurality of pores 100c. In one embodiment, the pores 100c of the polyamide layer 100 are in the form of through holes 100c1 or openings 100c2. When the pores 100c are in the form of the through holes 100c1, the through holes 100c1 of the pores 100c are connected to the surface 100a and the surface 100b located on both sides of the polyamide layer 100 (ie, the through holes 100c1 penetrate through the polyamide layer 100). Further, when the pores 100c are in the form of the openings 100c2, the openings 100c2 of the pores 100c are located in the portion, connected to the surface 100a only, of the polyamide layer 100 or in the portion, connected to the surface 100b only, of the polyamide layer 100 without penetrating through the polyamide layer 100.

In FIG. 1B, the cermet film 102a or the cermet film 102b is filled in at least the pores 100c of the polyamide layer 100. In one embodiment, the cermet film 102a and the cermet film 102b are simultaneously filled in the through holes 100c1 of the polyamide layer 100 and connected to each other through the through holes 100c1 to reinforce the structural strength of the high-rigidity material layer 10. In practical applications, the polyamide layer 100 of the present embodiment has a mesh structure, and the cermet film 102a is filled in the pores of the mesh structure to reinforce the strength of the high-rigidity material layer 10.

Figure 1C:
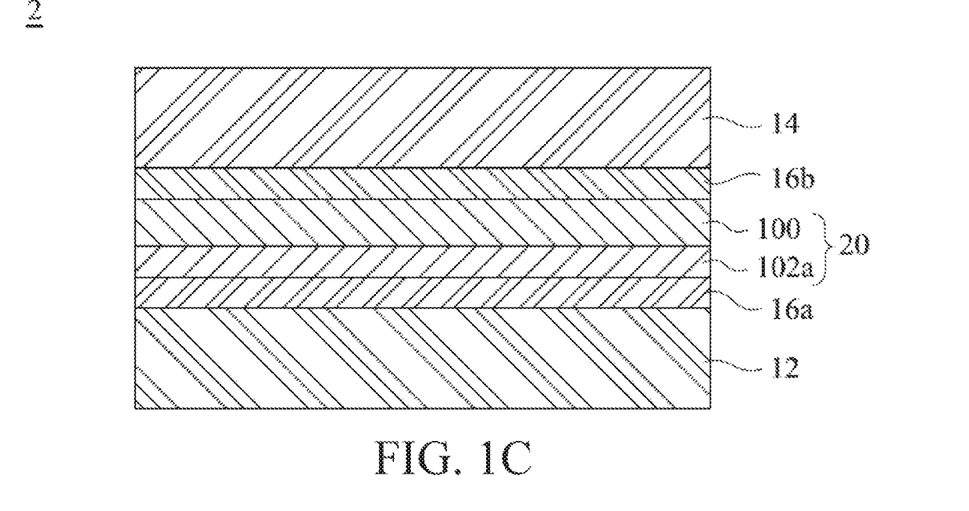
FIG. 1C is a cross-sectional view of a packaging film for a battery according to another embodiment of the invention.

Please refer to FIG. 1C. FIG. 1C is a cross-sectional view of a packaging film 2 for a battery according to another embodiment of the invention. As shown in FIG. 1C, the structures, functions and connection relationships of the components, namely the electrolyte-resistant layer 12, the protective layer 14, a high-rigidity material layer 20, the first adhesive layer 16a and the second adhesive layer 16b, of the packaging film 2 for the battery of the present embodiment are substantially the same as those of the packaging film 1 for the battery shown in FIG. 1A, and will not be repeated here. It should be noted that the difference between the present embodiment and the embodiment shown in FIG. 1A is that in the embodiment, the high-rigidity material layer 20 replaces the high-rigidity material layer 10 as shown in FIG. 1A.

In FIG. 1C, the high-rigidity material layer 20 has only the cermet film 102a on the surface 100a of the polyamide layer 100 compared to the high-rigidity material layer 10 shown in FIG. 1A. However, the invention is not limited to the foregoing structure configuration. In other embodiments, the high-rigidity material layer only have the cermet film 102b on the surface 100b of the polyamide layer 100.

Please refer back to FIG. 1A. In FIG. 1A, the protective layer 14 of the embodiment is attached to the high-rigidity material layer 10 through the first adhesive layer 16a. In the present embodiment, the protective layer 14 has a single-layer structure. In other embodiments, the protective layer 14 is a multilayer structure. In the present embodiment, the material of the protective layer 14 comprises polyamide or ethylene terephthalate. The protective layer 14 has abrasion resistance, extensibility and tensile strength, and is arranged outside the high-rigidity material layer 10 in a covering mode to protect the high-rigidity material layer 10.

The electrolyte-resistant layer 12 of the present embodiment is attached to the high-rigidity material layer 10 through the second adhesive layer 16b. In the present embodiment, the electrolyte-resistant layer 12 has a single-layer structure. In other embodiments, the electrolyte-resistant layer 12 is of a multilayer structure. The material of the electrolyte-resistant layer 12 comprises poly olefin hydrocarbon, such as polypropylene, polyethylene, modified polypropylene, or cast polypropylene (CPP), but not limited to the foregoing. The electrolyte-resistant layer 12 of the present embodiment made of the above material has a heat sealing property to provide sufficient heat sealing strength so as to prevent water or gas from entering, by permeating through the electrolyte-resistant layer 12, the covered battery, and thereby maintaining the chemical properties of electrolyte. The electrolyte-resistant layer 12 of the present embodiment prevents the highly corrosive electrolyte from flowing out, by permeating through the electrolyte-resistant layer 12, of the packaging film 1 for the battery, so as to ensure that the external environment is not contaminated.

In the present embodiment, the first adhesive layer 16a of the packaging film 1 for the battery is attached between the electrolyte-resistant layer 12 and the high-rigidity material layer 10. The second adhesive layer 16b is attached between the high-rigidity material layer 10 and the protective layer 14. The material of the first adhesive layer 16a and the second adhesive layer 16b is polyolefin resin, polyester resin, polyether resin, epoxy resin, any suitable material, or any combination of the foregoing. The thickness of the first adhesive layer 16a and the second adhesive layer 16b is substantially between 3 micrometers (μm) and 8 micrometers (μm). However, the disclosure is not limited to the above thickness configuration. In other embodiments, any suitable thickness of the first adhesive layer 16a and the second adhesive layer 16b can be applied to the present disclosure.

Figure 2:
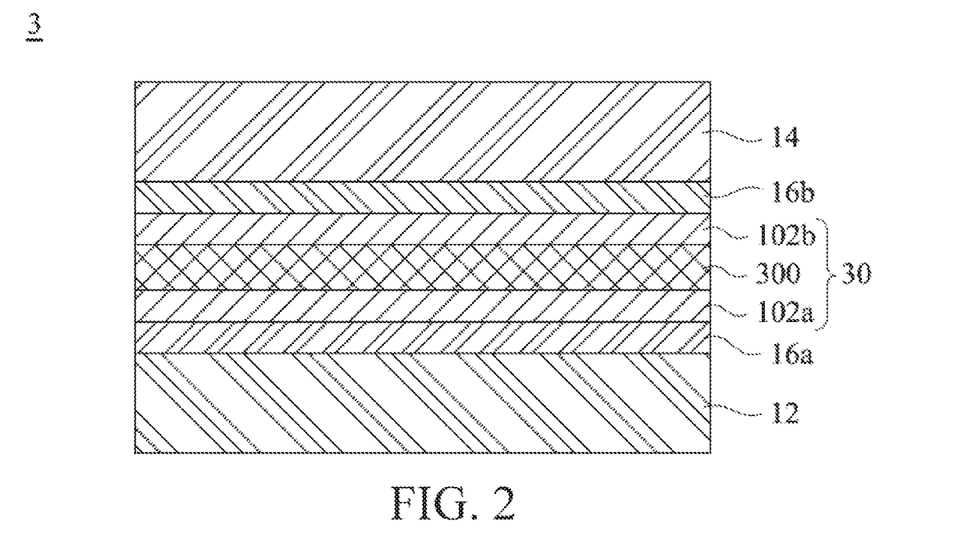
FIG. 2 is a cross-sectional view of a packaging film for a battery according to another embodiment of the invention.
Figure 3:
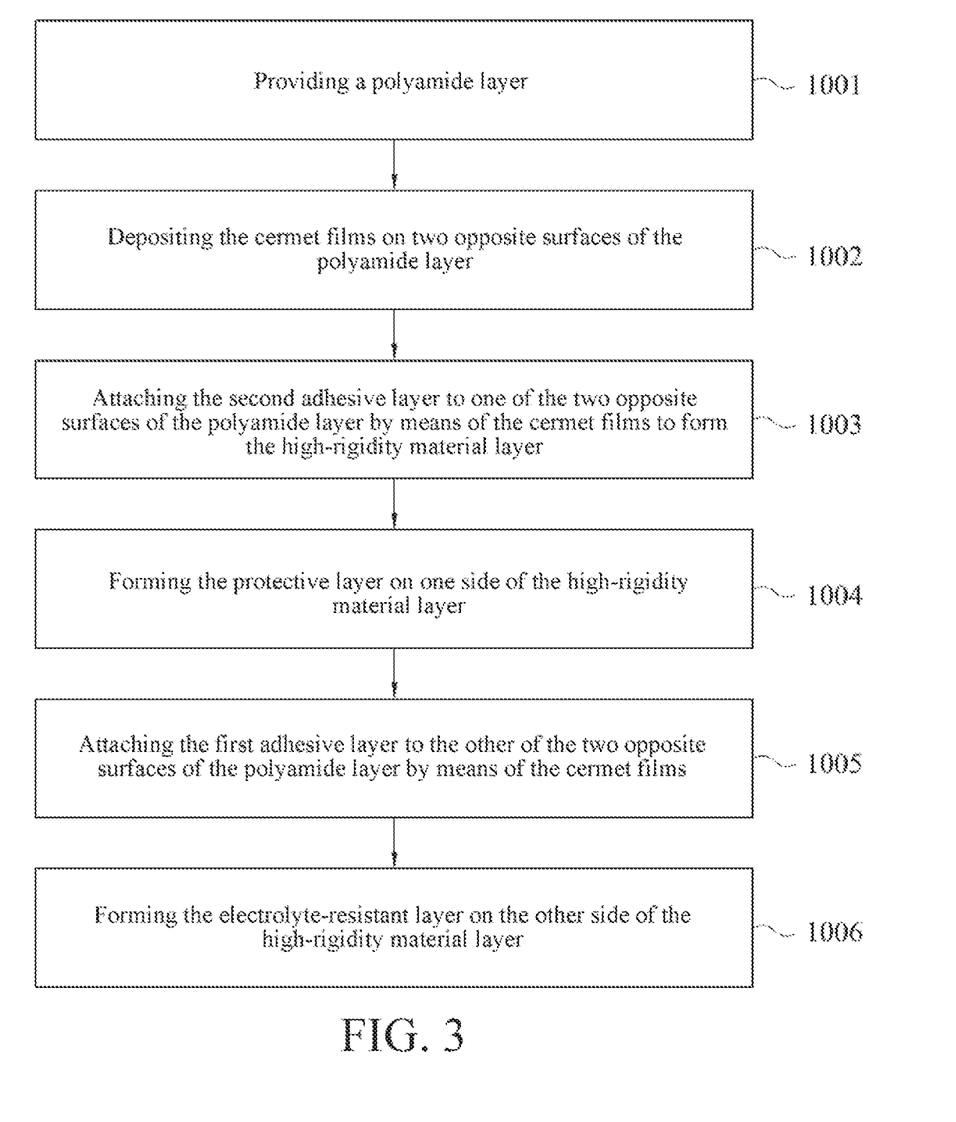
FIG. 3 is a flow chart of some embodiments of a manufacturing method of a packaging film for a battery.

Please refer to FIG. 2. FIG. 2 is a cross-sectional view of a packaging film 3 for a battery according to another embodiment of the invention. As shown in FIG. 2, the structures, functions and connection relationships of the components, namely the electrolyte-resistant layer 12, the protective layer 14, a high-rigidity material layer 30, the first adhesive layer 16a and the second adhesive layer 16b, of the packaging film 3 for the battery of the present embodiment are substantially the same as those of the packaging film 1 for the battery shown in FIG. 1A, and will not be repeated here. It should be noted that the difference between the present embodiment and the embodiment shown in FIG. 1A is that in the present embodiment, a metal layer 300 (which may also be referred to as a substrate layer in the present embodiment) replaces the polyamide layer 100 in the high-rigidity material layer 10 shown in FIG. 1A.

In the present embodiment, the metal layer 300 has a plurality of pores, and the cermet film 102a or the cermet film 102b is filled in at least the pores. In one embodiment, the metal layer 300 of the present embodiment is of a mesh structure, and the metal ceramic film 102a is filled in the pores of the mesh structure to reinforce the strength of the high-rigidity material layer 30. In an embodiment, the metal layer 300 is copper foil without pores.

FIG. 4 is a flow chart of some embodiments of a manufacturing method of the packaging film 1 for the battery. FIGS. 5A-5F are cross-sectional views of the packaging film 1 for the battery in various manufacturing stages according to some embodiments of the invention.

Although the manufacturing method of the packaging film 1 for the battery is illustrated and described herein as a series of steps or events, it should be understood that the order in which such steps or events are illustrated is not to be read in a limiting sense. For example, some steps may occur in different orders and/or concurrently with other steps or events, in addition to those illustrated and/or described herein. Additionally, implementing one or more aspects or embodiments described herein may not require all of the illustrated operations. Further, one or more of the steps depicted herein may be implemented in one or more separate steps and/or stages. Specifically, the manufacturing method of the packaging film 1 for the battery comprises steps 1001 to 1006.

Figure 4A:
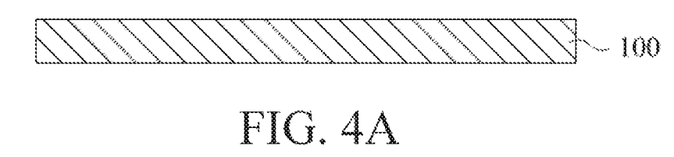
FIGS. 4A-4F are cross-sectional views of a packaging film for a battery in an intermediate manufacturing stage according to an embodiment of the invention.

In step 1001, a substrate layer is provided. In the present embodiment, the substrate layer is formed by hot-pressing a nylon net. In other words, the substrate layer of the present embodiment is the polyamide layer 100 shown in FIG. 1A. FIG. 4A illustrates some embodiments corresponding to the step 1001. In other embodiments, the polyamide layer 100 of the present embodiment is replaced by a metal layer 200, and the metal layer 200 is formed by hot-pressing a metal net. Further, the metal layer 200 is copper foil which is not hot-pressed.

Figure 4B:
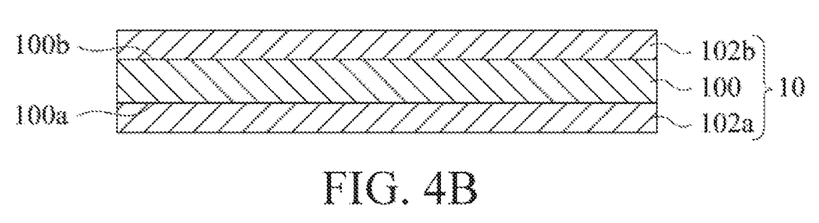

In step 1002, the cermet film 102a and the cermet film 102b are deposited on the surface 100a and the surface 100b of the polyamide layer 100 respectively to form the high-rigidity material layer 10 together with the polyamide layer 100. The method for depositing the cermet film 102a and the cermet film 102b comprises using a physical vapor deposition (PVD) process. However, the invention is not limited to this. In other embodiments, any suitable deposition process is able to be applied to the disclosure. FIG. 4B illustrates some embodiments corresponding to the step 1002.

Figure 4C:
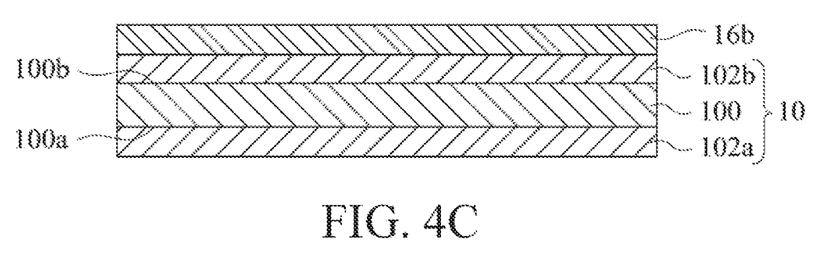

In step 1003, the second adhesive layer 16b is attached to the cermet film 102b located on the surface 100b of the polyamide layer 100 to form the high-rigidity material layer 10. FIG. 4C illustrates some embodiments corresponding to the step 1003. In the present embodiment, the cermet film 102b is arranged between the second adhesive layer 16b and the polyamide layer 100. However, in other embodiments, the second adhesive layer 16b is directly attached to the surface 100b of the polyamide layer 100 without the cermet film 102b being located therebetween.

In addition, the embodiments and configurations of the components in the disclosure are merely exemplary and not intended to limit the invention. For example, the description that a first feature is formed on a second feature includes that the first feature is directly contact with the second feature. Further, in an embodiment, an additional feature that formed between the first and second features where the first feature is not directly contact to the second feature is also comprised in the disclosure.

Figure 4D:
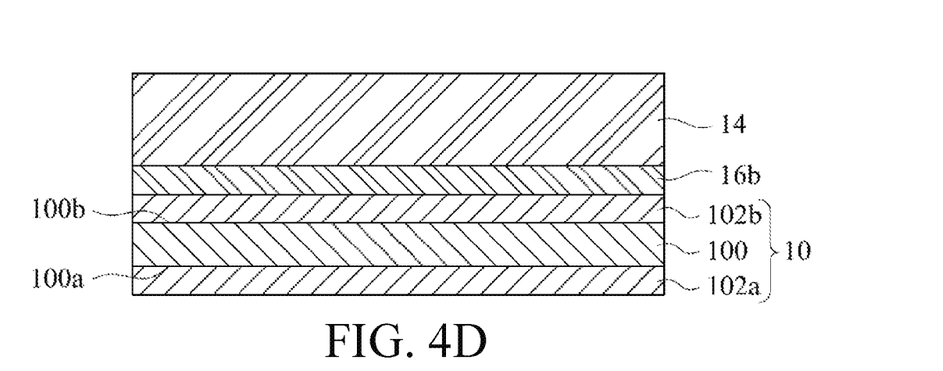

In step 1004, the protective layer 14 is adhered to one side of the high-rigidity material layer 10. FIG. 4D illustrates some embodiments corresponding to the step 1004.

Figure 4E:
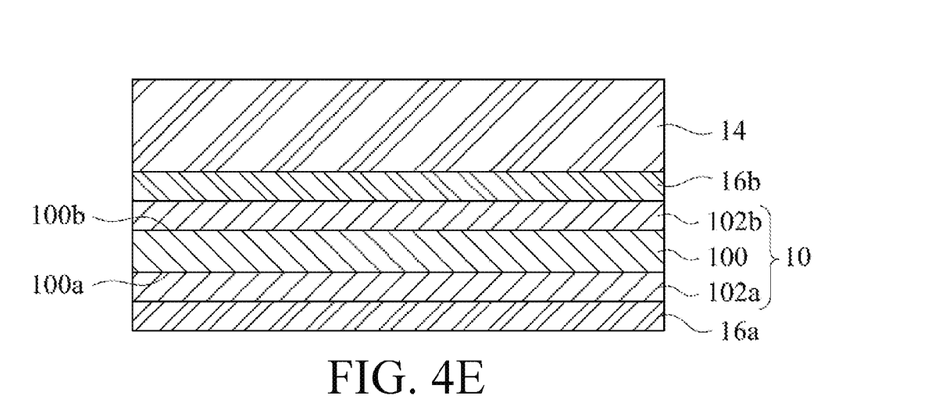

In step 1005, the first adhesive layer 16a is attached to the surface 100a of the polyamide layer 100. FIG. 4E illustrates some embodiments corresponding to the step 1005.

Figure 4F:
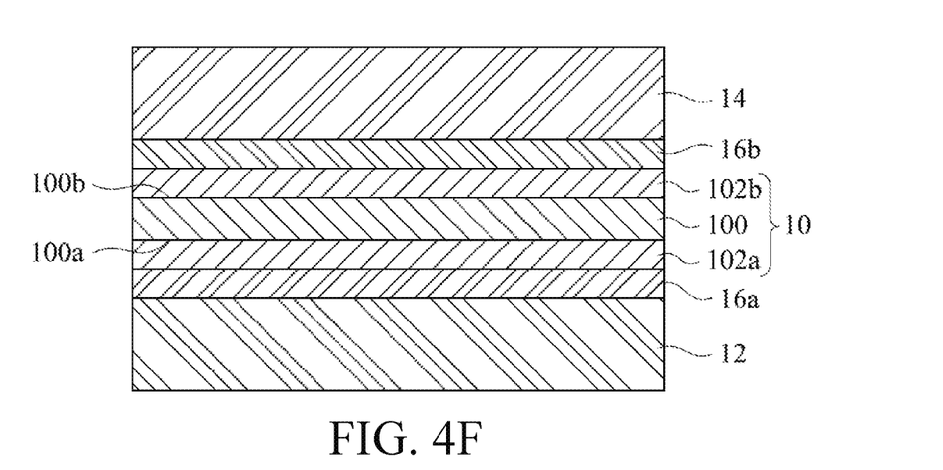

In step 1006, the electrolyte-resistant layer 12 is adhered to the other side, opposite to the protective layer 14 of the high-rigidity material layer 10, thereby completing the manufacture of the packaging film 1 for the battery. In other embodiments, the electrolyte-resistant layer 12 is coated on the side that away from the surface 100a of the first adhesive layer 16a. FIG. 4F illustrates some embodiments corresponding to the step 1006.

From the foregoing detailed description of the specific embodiments of the invention, it is clearly seen that the high-rigidity material layer of the packaging film for the battery in the invention comprises the cermet films. The cermet films provide sufficient structural strength at thin thicknesses (eg, 4-10 μm), and therefore is able to be shaped to meet the appearance requirement of the covered battery and is water or liquids proved from entering the covered battery. In addition, in some embodiments, the substrate layer has a plurality of pores, and the cermet films are filled in at least the pores of the substrate layer thus to reinforce the strength of the high-rigidity material layer. Therefore, the thickness of the packaging film for the battery is further reduced.

The foregoing features of the various embodiments provide those skilled in the art with a full understanding of various aspects of the invention, and those skilled in the art should understand that in order to achieve the same purpose and/or the same advantages of the embodiments mentioned herein, other processes and structures further designed or modified easily based on the invention. It should also be understood by those skilled in the art that these same structures do not depart from the spirit and scope of the invention, and various changes, substitutions and amendments may be made without departing from the spirit and scope of the invention.

What is claimed is:

1. A packaging film for a battery, comprising:
an electrolyte-resistant layer comprising polyolefin;
a protective layer comprising polyamide or ethylene terephthalate and configured to have an abrasion resistance; and
a rigid material layer, located between the electrolyte-resistant layer and the protective layer, and comprising:

a substrate layer being a polyamide layer, having a plurality of pores, and with two surfaces, one of the two surfaces facing the electrolyte-resistant layer and the other one of the two surfaces facing the protective layer respectively; and at least one cermet film located on at least one of the two surfaces of the substrate layer and filled in the pores of the substrate layer.

2. The packaging film for the battery according to claim 1, wherein the material of the cermet films comprises oxide-based cermet, carbide-based cermet, nitride-based cermet, boride-based cermet, silicide-based cermet or combinations thereof.

3. The packaging film for the battery according to claim 1, further comprising a first adhesive layer and a second adhesive layer, wherein the first adhesive layer is attached between the electrolyte-resistant layer and the rigid material layer, and the second adhesive layer is attached between the rigid material layer and the protective layer.

4. A manufacturing method of a packaging film for a battery, comprising:

depositing a cermet film on at least one of two opposite surfaces of a polyamide layer that has a plurality of pores therein to form a rigid material layer such that the cermet film is filled in the pores of the polyamide layer;

forming a protective layer comprising polyamide or ethylene terephthalate on one side of one of two opposite surfaces of the rigid material layer, wherein the protective layer is configured to have an abrasion resistance; and forming an electrolyte-resistant layer comprising polyolefin on one side of the other of the two opposite surfaces of the rigid material layer.

5. The manufacturing method of the packaging film for the battery according to claim 4, wherein depositing the cermet film on at least one of the two opposite surfaces of the polyamide layer is achieved by a physical vapor deposition (PVD) process.

6. The manufacturing method of the packaging film for the battery according to claim 4, further comprising:

hot-pressing a nylon net to form the polyamide layer before depositing the cermet film.

* * * * *